3,550,438
ULTRASONIC TESTING SYSTEM FOR
HOT OBJECTS
Marian Kapluszak, St. Germain-en-Laye, Yvelines, France, assignor to Institut de Recherches de la Siderurgie Francaise, Saint-Germain-en-Laye, Yvelines, France
Filed Oct. 1, 1968, Ser. No. 764,057
Claims priority, application France, Oct. 6, 1967, 123,623
Int. Cl. H04r 17/00; G01n 29/04
U.S. Cl. 73—71.5
7 Claims

ABSTRACT OF THE DISCLOSURE

The testing head of an ultrasonic testing system has casing supplied with water under pressure and encloses a transducer. The beam emitted from the transducer is reflected outwardly through an opening in the casing wall through which the water is discharged in a column at right angles to a surface of the tested object, the casing being held by spacers at a slight distance from the object so that a passage leading away from the opening is bounded by the casing wall and the object. One or more reflecting faces in the casing cause the beam of the transducer to be concentrated in a portion of the surface cooled by the impinging water column, thus permitting the testing of rolled metal objects much hotter than 100° C.

BACKGROUND OF THE INVENTION

This invention relates to the ultrasonic testing of metallic objects, and particularly to the testing of continuously moving hot metal objects.

In its more specific aspects, the invention is concerned with the testing of ferrous objects at the rolling temperature, more particularly the hot-rolling temperature. It is necessary to employ a coupling liquid in the path of the ultrasonic beam between the emitting and receiving face of the transducer and an entrance surface of the tested object. Yet, the latter is much hotter than the boiling point of any practical coupling fluid, water being the only material low enough in cost and otherwise acceptable. Another problem in the testing of hot ferrous objects to which this invention addresses itself is due to the plasticity of the hot metal which causes much of the incident radiation to be absorbed, thereby attenuating the reflected error signals.

SUMMARY OF THE INVENTION

It has now been found that water can be employed as a coupling fluid without the formation of steam and the resulting interference with the testing process by directing the water against a portion of the object surface from a nozzle substantially at right angles to the surface portion, then radially on said surface at a velocity sufficient in all points so that the water does not reach its boiling point on said surface portion. A reflector arrangement reflects the beam from the transducer toward a restricted central area of the surface portion against which the water impinges.

The nozzle may consist of a casing having an apertured outer wall. Spacers hold the casing in a position relative to the tested object in which the outer wall and the surface of the object to be tested are spaced from each to define a narrow passage extending away from the wall opening, the portion of the surface aligned with the opening being impinged by the discharged water which is supplied to the casing at high pressure.

If the opening is circular about an axis transverse to the wall and the passage extends radially away from the opening in all directions, the curved reflector face is directed axially toward the opening in the casing. The emitting and receiving face of the transducer may be of substantially circular flat shape about the axis and directed toward the opening and another concavely curved annular reflector face about the axis to reflect ultrasonic radiation from the transducer face to the first-mentioned reflector face.

If the opening is an elongated slot, the transducer is chosen to have a rectangular face, and its emitted beam is reflected into a central portion of the slot by a concavely cylindrical reflector face whose axis of curvature is parallel to the direction of elongation of the slot, and parallel to the transducer face.

Basically, one of the main features of the invention is to provide means for concentrating the energy of an ultrasonic beam on a very small portion of the object surface. This concentration has the advantage of increasing the energy per unit of surface in any sectional area of the beam. That increases also the sensitivity of the testing. This is particularly useful for testing metal products at high temperatures, for instance steel products at rolling temperatures. In said cases the energy of the beam is rapidly damped, owing to the plasticity of the hot metal. It is also possible, and that is another advantage of the invention, to obtain a beam having such a convergence that the gradual decrease of sectional area compensates, at least partially, the absorption of energy in the metal as a function of the distance.

Other features, additional objects, and many of the attendant advantages of this invention will readily be apreciated as the same becomes better understood by reference to the following detailed description of preferred embodiments when considered in connection with the appended drawing.

DESCRIPTION OF THE PREFERRED EMBODIMENTS

Figure 1:
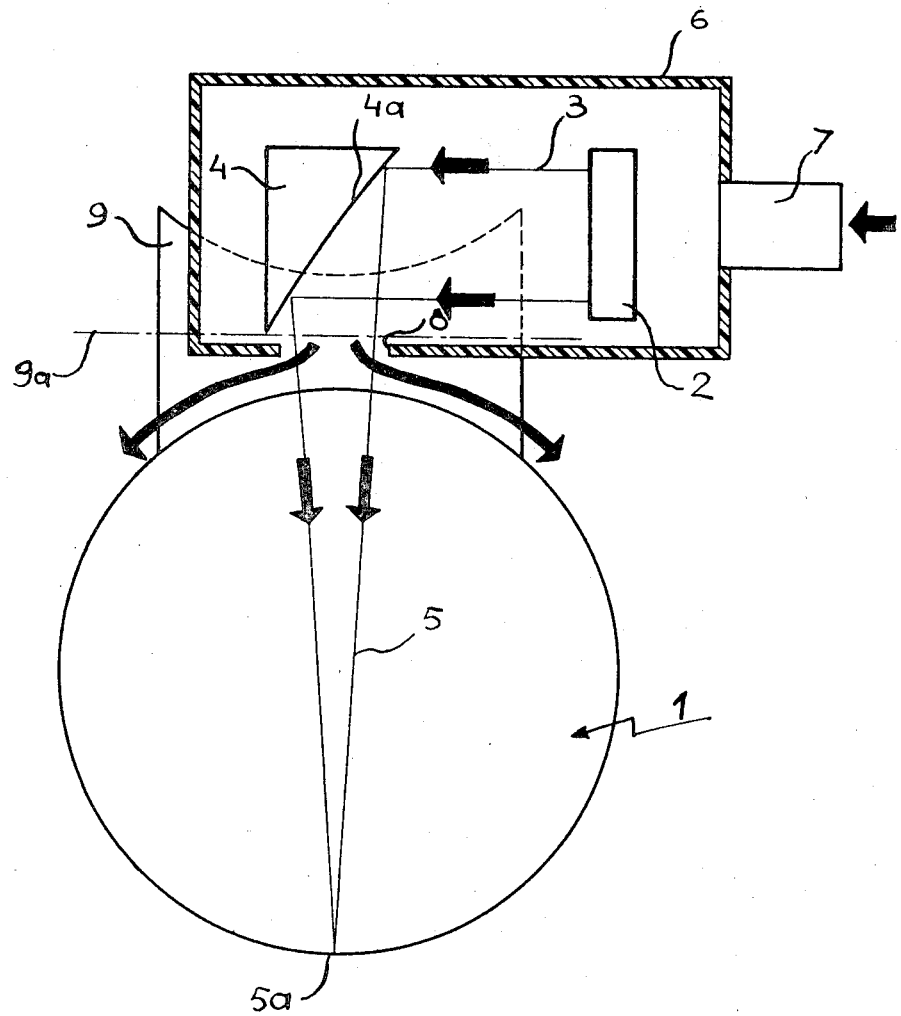
FIG. 1 shows an ultrasonic testing system of the invention in elevational section.

Referring initially to FIG. 1, there is seen a continuously cast cylindrical billet 1 which it is desired to test for internal defects by ultrasonic radiation passing generally in the direction of billet thickness. The diameter of the billet is 130 mm., and its length is infinite for practical purposes. A barium titanate transducer 2 having the shape of a rectangular parallelepiped serves as the emitter and receiver of ultrasonic waves, and has a resonant frequency of 1 mHz. The length of the transducer at right angles to the plane of the drawing is 40 mm. and the height of its active face is 30 mm.

The transducer 2 is connected with a non-illustrated source of alternating current in a conventional manner. When energized, it emits an ultrasonic beam 3 of practically parallel rays toward a carefully polished face 4a of a hollow chromium steel element 4 having a wall thickness of 1.5 mm. The length of the element 4 at right angles to the plane of the drawing is about equal to that of the transducer 2. Its face 4a is cylindrically concave with a radius of 350 mm. about an axis perpendicular to the drawing plane. The exposed concave face of the element 4 causes the reflected rays 5 of the ultrasonic beam 3 to converge so that the reflected beam 5 has the shape of a wedge whose apex or crest 5a is parallel to the longitudinal axis of the billet 1 in the focal plane of the reflector surface 4a.

The angle of incidence of the beam 3 on the face 4a is close to 45° and is thus outside the critical angles, a necessary condition for practically complete reflection. The minor losses caused by transmission in the wall 4a are reduced to a minimum by the fact that the wall thickness of the element 4 is 1.5 mm., or one quarter of the wavelength in steel of the ultrasonic radiation employed.

The transducer 2 and the element 4 are fixedly mounted in a casing 6 which also envelops the coupling medium constituted by water introduced under high pressure through a conduit 7 and released from the casing 6 through a narrow slot 8 in an outer casing wall. The slot is elongated at right angles to the drawing plane and positioned in the path of the reflected beam 5. The casing 6 is mounted in such a manner that the water released through the slot 8 impinges at high velocity on the surface of the billet 1 then flows in a radial direction, thus permitting the ultrasonic testing of the billet when the same is at a high temperature. The pressure of the water is held high enough so that the surface of the billet is cooled to a temperature below 100° C., in the limited area of incidence of the beam 5. The formation of a very thin film of steam which usually occurs and would reflect the emitted energy almost totally, can thereby be prevented.

The casing 6 is made of a plastic having a sufficiently high absorption coefficient to prevent the emission of parasitic signals. The casing 6 together with the reflecting face 4a is held at a constant distance from the surface of the longitudinally traveling billet 1 by two rollers 9 of which only one is seen, and which are fastened to opposite sides of the casing 6 by non-illustrated brackets. The illustrated roller 9 turns about its axis 9a which is fixed relative to the casing 6, and its approximate hourglass shape conforms to the curvature of the billet 1 on which it rides.

The distance between the reflecting face 4a and the specimen billet 1 is chosen so that the beam 5 is focused in the surface of the billet at the area thereof which is farthest removed from the reflecting face. While this arrangement is not critically important, it provides a bottom echo of maximum amplitude. All rays of the beam 5 are practically perpendicular to the entrance surface of the billet 1, whereby reflection is eliminated, and the power available is utilized at high efficiency.

Figure 2:
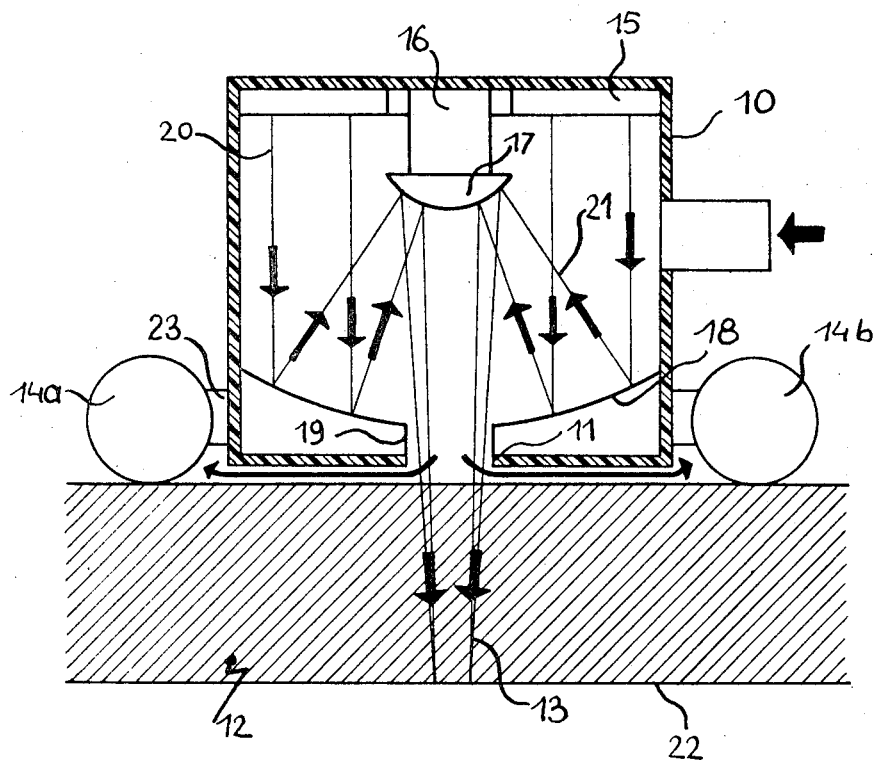
FIG. 2 shows another ultrasonic testing system of the invention in a similar view.

The modified arrangement illustrated in FIG. 2 is intended for testing flat steel products while they travel away from a rolling mill at high temperature. Water under pressure is used as a coupling fluid in a plastic casing 10 having the general shape of a cylinder of 130 mm. diameter about an upright axis located in the drawing plane. The water delivered to the casing 10 under pressure as described above is released at high velocity through a circular opening 11 centered in the flat bottom of the casing to produce an intensive cooling effect in its area of impact on the surface of a travelling, hot steel piece 12.

This area simultaneously receives a reflected beam 13 of ultrasonic radiation which enters the piece 12 unimpeded by even a thin sheet of steam on the metal surface. The casing 10 is mounted on a supporting frame 23 provided with rollers 14a, 14b which travel along the surface of the moving piece during operation of the illustrated apparatus, the casing 10 being prevented by its water pipe and electrical connecting cables from moving with the specimen.

The transducer 15 which emits and receives ultrasonic waves in the apparatus of FIG. 2 is a circular barium titanate plate also having a resonant frequency of 1 mHz., and mounted on the top wall in the casing 10. It has a central aperture to permit a cylindrical support 16 to be attached coaxially to the casing top. The support carries a reflector 17 having a spherically convex face centered in the casing axis. Another reflector 18 having a spherical concave face about the casing axis is mounted on the casing bottom opposite the reflector 17. The circular opening 19 in the center of the reflector 18 is axially aligned and radially coextensive with the opening 11 in the casing bottom, the diameters of the openings 11 and 19 being 25 mm. The reflectors 17, 18 are hollow chromium-steel elements having a wall thickness of 1.5 mm.

The ultrasonic beam 20 emitted by the transducer 15 consists essentially of parallel rays which are reflected by the first reflector 18 into a conically converging beam 21 focused on the second reflector 17. The latter again reflects the ultrasonic waves into the conically converging beam 13 which strikes but a very restricted area of the lower surface 22 of the piece 12 in order to produce a bottom echo of the greatest possible amplitude. The convergence of the beam 13 may be precisely adjusted to fit the thickness of the tested material by shifting the reflector 17 in the direction of the casing axis, as by replacing the support 16 by another one of different axial height. When the focal points of the reflectors 17, 18 are made to coincide the beam impinging on the piece 12 is parallel. The beam may also be made divergent.

It is thus possible to make the angle between the beam 13 and the the entrance face of the piece 12 practically perpendicular to limit reflection and refraction losses. In that case, such a beam of small convergence (or cylindrical) of a few millimetres diameter is very convenient for testing thick flat products owing to its normal incidence and concentrated energy.

The apparatus illustrated in FIG. 1 whose beam has the shape of a thin blade or wedge is particularly advantageous for the testing of round metal objects, all its rays being perpendicular to the axis of the cylindrical billet 1 and to its circumference, while most rays of a conical beam or a beam of parallel rays could be perpendicular only to the axis.

The system illustrated in FIG. 2, whose beam 13 is a cone having a very small acute apex angle, is particularly advantageous for testing flat specimens, the deviation of the incident rays from a precisely perpendicular relationship to the entrance face being minimal.

The two embodiments of the invention described above provide the known advantages of focused ultrasonic beams. The gain determined in the system of FIG. 1, when operated under the conditions specifically described, has been found to amount to +12 db in the center of the billet in which the beam has a thickness of 6 mm., as compared to an otherwise identical system without focusing provisions and operated at the same level of emitted energy.

The energy losses in the scanning head are reduced virtually to zero because of the use of reflecting surfaces for focusing the ultrasonic beam. The transmission losses in conventional focusing systems which employ acoustical lenses are substantial, and may amount to 80 to 90%, thus making fine testing impossible under most conditions. With certain precautions, the focusing system according to the invention, does not involve practically any energy loss. Consequently care will be taken that the angle of incidence to be greater than the two critical angles of reflection or, if it is not the case, that the thickness of the reflector be equal to ¼ of the wave length of the ultrasonic wave in the material of the reflector. For instance, with a testing frequency of 1 mHz., a reflector of polished steel should have a thickness of 1.5 mm.

The high concentration of transducer energy in a small volume of the tested object in the systems of the invention permits minute defects to be detected even in the relatively soft metal as it comes from the rolling mill at a temperature of 1200° to 1400° C. In practical operation, the coupling between the transducer and the tested object, is generally obtained by flowing water. As a result, when the surface of the tested product is at a high temperature the calefaction and formation of steam in front of the transducer hinder or even prevent the passing of the beam. In a known method a stream of liquid couplant at a very high speed reduces locally the surface temperature of the area in front of the transducer, then flows radially between the transducer and the test piece, preventing the steam to come in front of the transducer. The speed of the cooling water should be sufficient on all points so that said water does not reach its boiling point in front of the transducer. This method gives satisfactory results when the transducer does not have a comparatively great surface. When it is required to increase this surface, in order to increase the emitted energy, the radial speed of the water decreases and calefaction occurs, and that decreases the advantage of a greater surface of the transducer. The invention enables to concentrate the energy emitted by a transducer of greater surface in a small central region of the flowing coupling liquid, where there are lesser possibilities of calefaction, so great improvements to the testing of products at high temperature have been obtained.

What is claimed is:

1. In an ultrasonic testing system for an object having a temperature higher than 100° C., the system having a piezoelectric transducer, energizing means for causing the transducer to emit a beam of ultrasonic radiation, and coupling means for maintaining a body of flowing water in the path of said beam between said transducer and said object, the improvement which comprises:
 (a) nozzle means for directing said body of water substantially at right angles against a portion of the surface of said object then radially on said surface with a sufficient speed in all points so that the water does not reach the boiling point on said portion of the surface; and
 (b) reflector means for reflecting the beam emitted from said transducer toward said portion,
  (i) said reflector means including a curved reflector face, the curvature of said face being such as to cause the rays of the reflected beam to converge from said transducer toward a restricted central area of said portion.

2. In a system as set forth in claim 1, said nozzle means including a casing having an outer wall and being formed with an opening having an axis transverse of said wall; spacer means for holding said casing in a position relative to said object in which the surface of said object and said outer wall are spaced from each other to define a narrow passage extending radially away from said axis, said portion of the surface being axially aligned with said opening; and supply means for supplying said casing with water at high pressure.

3. In a system as set forth in claim 2, said transducer having an emitting and receiving face in said casing transverse to said axis and spaced from said opening, said curved reflector face being directed axially toward said opening.

4. In a system as set forth in claim 3, said face of said transducer being of substantially circular flat shape about said axis and directed toward said opening, said reflector means including another concavely curved reflector face of annular shape about said axis and directed toward said face of said transducer and said first-mentioned reflector face.

5. In a system as set forth in claim 1, said nozzle means including a casing having an outer wall and being formed with an elongated slot in said wall; spacer means for holding said casing in a position relative to said object in which the surface of said object and said outer wall are spaced from each other to define a narrow passage extending away from said slot along said outer wall; and supply means for supplying said casing with water at high pressure, whereby water is discharged from said slot against said surface, said portion of the surface being aligned with said slot in the direction of discharge of said water.

6. In a system as set forth in claim 5, said transducer having a flat rectangular emitting and receiving face in said casing, and said reflector face being arranged in said casing and cylindrical about an axis parallel to the direction of elongation of said slot, the curvature and position of said reflector face being such as to receive the beam emitted by said face of said transducer and to cause the reflected beam to converge toward a central portion of said slot.

7. In a system as set forth in claim 6, said reflector face being concave, said face of said transducer being parallel to the axis of said reflector.

References Cited
UNITED STATES PATENTS

| | | | |
|---|---|---|---|
| 3,190,112 | 6/1965 | Beaujard et al. | 73—71.5 |
| 3,233,449 | 2/1966 | Harmon | 73—67.8 |
| 3,237,445 | 3/1966 | Wood | 73—67.5 |
| 3,485,088 | 12/1969 | O'Connor | 73—67.8 |

RICHARD C. QUEISSER, Primary Examiner

J. P. BEAUCHAMP, Assistant Examiner

U.S. Cl. X.R.

73—67.8; 310—8.7